(12) United States Patent
Chang et al.

(10) Patent No.: US 10,031,975 B2
(45) Date of Patent: Jul. 24, 2018

(54) PRESENTATION OF SEARCH RESULTS BASED ON THE SIZE OF THE CONTENT SOURCES FROM WHICH THEY ARE OBTAINED

(71) Applicant: Sony Corporation, Tokyo (JP)

(72) Inventors: Michael Chang, San Diego, CA (US); Jesse Gallup, San Marcos, CA (US)

(73) Assignee: SONY CORPORATION, Minato-Ku (JP)

( * ) Notice: Subject to any disclaimer, the term of this patent is extended or adjusted under 35 U.S.C. 154(b) by 222 days.

(21) Appl. No.: 14/196,319

(22) Filed: Mar. 4, 2014

(65) Prior Publication Data
US 2015/0254346 A1    Sep. 10, 2015

(51) Int. Cl.
*G06F 17/30*    (2006.01)
(52) U.S. Cl.
CPC .............. *G06F 17/30867* (2013.01)
(58) Field of Classification Search
CPC combination set(s) only.
See application file for complete search history.

(56) References Cited

U.S. PATENT DOCUMENTS

| | | | |
|---|---|---|---|
| 6,944,612 B2 | 9/2005 | Roustant et al. | |
| 2008/0282291 A1* | 11/2008 | Henty | H04N 21/4622 725/44 |
| 2011/0153589 A1* | 6/2011 | Vaitheeswaran | G06F 17/30705 707/709 |
| 2012/0095958 A1 | 4/2012 | Pereira et al. | |
| 2012/0254186 A1* | 10/2012 | Winner | G06F 17/3087 707/740 |
| 2012/0324367 A1* | 12/2012 | Ilyas | G06F 17/30867 715/747 |

OTHER PUBLICATIONS

Thomas et al., "Server selection methods in personal metasearch: a comparative empirical study", http://es.csiro.au/pubs/thomas_ir09.pdf, CSIRO ICT Centre,Canberra,AU and Funnelback Pty Ltd-,Dickson,AU, published 2009, pp. 1-25.

* cited by examiner

*Primary Examiner* — Shyue Jiunn Hwa
(74) *Attorney, Agent, or Firm* — Mayer & Williams, PC; Mark D. Wieczorek (57) ABSTRACT

Search results are prioritized based on the size of the content sources from which the search results were obtained. Such content sources may include, for instance, a user's local sources (e.g., a hard drive associated with a user's computer), a user's online content sources (e.g. a user's cloud storage), and the entire web. Search results which are obtained from smaller content sources (i.e., those containing fewer resources) are presented to the user before search results which are obtained from larger content sources (i.e., those containing a greater number of resources).

18 Claims, 5 Drawing Sheets

PRESENTATION OF SEARCH RESULTS BASED ON THE SIZE OF THE CONTENT SOURCES FROM WHICH THEY ARE OBTAINED

BACKGROUND

Large volumes of information can be electronically accessed over networks such as the Internet. Searching services are used to identify particular information, such as web pages, media files and other resources that may be relevant to a user. A search service can identify resources in response to a text search query that includes one or more search phrases (i.e., one or more words). The search service ranks the resources based on measures of relevance of the resources to the search query and on measures of quality of the resources. In turn, the search service selects a quantity of the ranked resources and provides search results that link to the selected resources. The search results are typically ordered for viewing according to the rank of the resource to which the search result links, and provided in a search results page. Given the large number of resources that may be available on the search results page, it can be difficult and time-consuming for a user to find the particular resources that are of interest to him or her.

SUMMARY

In accordance with one aspect of the invention, search results are prioritized based on the size of the content sources from which the search results were obtained. Such content sources may include, for instance, a user's local sources (e.g., a hard drive associated with a user's computer), a user's online content sources (e.g. a user's cloud storage), and the entire web.

Search results which are obtained from smaller content sources (i.e., those containing fewer resources) are presented to the user before search results which are obtained from larger content sources (i.e., those containing a greater number of resources). For instance, if the search results are displayed in the form of a list on a search results page, those search results obtained from smaller content sources are presented higher up on the list than results which are obtained from larger content sources. By ordering the search results in this way a user will first examine those resources which are assumed to be most relevant to the user, since they come from sources with the least amount of content. On the other hand, those resources which appear lower down on the list and which are subsequently examined by the user come from content sources with the most amount of content, which are presumed to be more generic resources that are less sought after by the user.

DETAILED DESCRIPTION

Figure 1:
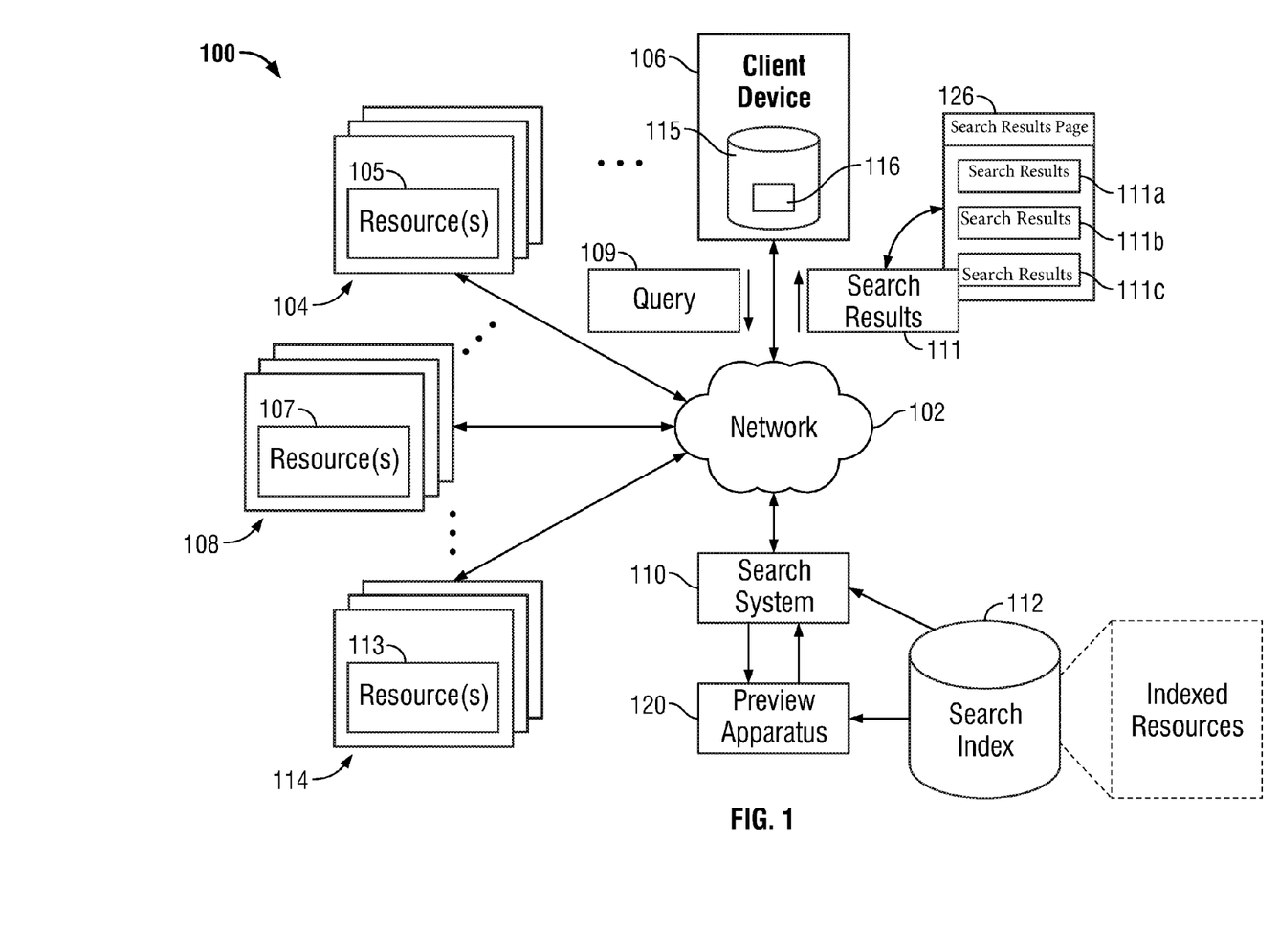
FIG. 1 is a block diagram of a search environment that facilitates resource search operations on a client device.

FIG. 1 is a block diagram of a search environment 100 that facilitates resource search operations on a client device. The example environment 100 includes a network 102, e.g., a local area network (LAN), wide area network (WAN), the Internet, or a combination thereof. The network 102 connects online data repositories 104, 108 and 114, client device 106, and the search system 110. In general, the environment 100 may include any number of online data repositories and client devices.

Online data repositories such as data repositories 104, 108 and 114 store a collection of resources. A resource is any content item that can be provided to the client device 106 by an online data repository over the network 102. Resources may include, by way of illustration only, HTML pages, text-based documents, audio, images, video, and feed sources. The resources may include embedded information (e.g., meta information and hyperlinks) and/or embedded instructions (e.g., JavaScript scripts). In example shown in FIG. 1 online data repository 104 includes resources 105, online data repository 108 includes resources 107 and online data repository 114 includes resources 113.

Each data repository such as the data repositories shown in FIG. 1 are all associated with a content source. In the simplest case, a single data repository such as data repositories 104, 108 and 114 may each be associated with their own content source. In this case, as FIG. 1 indicates, a content source may correspond to a single physical location or device such as a server.

Figure 2:
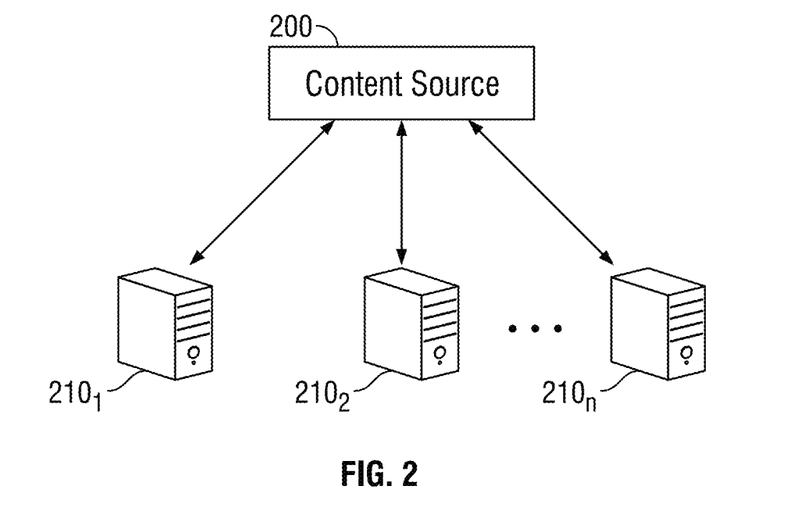
FIG. 2 schematically illustrates a single content source that stores data on multiple data repositories.

In other more complex examples a content source may represent an aggregation of individual data repositories. For instance, resources associated with a common domain name, yet located on multiple data repositories such as physically distributed servers, may belong to a common content source. That is, resources available from a single domain such as www.Sony.com, for instance may belong to the same online content source, regardless of where the resources physically reside. As another example, resources available from a single online service, even if provided from different domains and different data repositories, may be treated as belonging to a common content source. Likewise, documents or other resources maintained for a given user by a single online service (e.g., a cloud storage service) or by multiple online services (e.g., multiple social networking sites) may be treated as being available from the same content source. As yet a further example, all resources obtained from a single enterprise, even if from different addresses with different domain names, may be treated as being available from the same content source. FIG. 2 schematically illustrates the situation where a single content source 200 stores data on multiple data repositories $210_1$, $210_2$, ... $210_n$.

Figure 3:
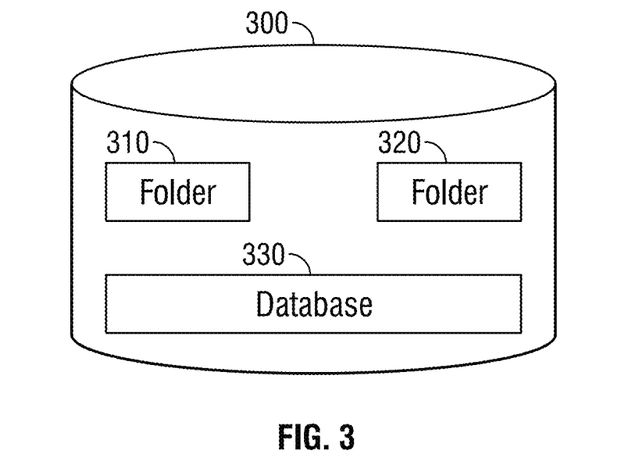
FIG. 3 schematically illustrates multiple sub-parts of a data repository such as folders and databases that each represents a different content source.

In yet other examples a content source may represent a logical subset of a data repository. For instance, FIG. 3 shows a data repository 300 configured as a computer-readable storage medium that includes folders 310 and 320 and a database 330. In this example the folders 310 and 320 and a database 330 may each be treated as a separate content source.

In addition to online data repositories, the search environment 100 shown in FIG. 1 may also include one or more local data repositories 115 which are locally available to client device 106. That is, local data repositories are sources of resources that are available to the client device 106 without accessing the network 102. Examples of local data repositories may include physical devices such as removable or non-removable storage devices (e.g., a hard drive, flash memory, an optical storage device). Local data repository 115 may store resources 116.

A local content source may represent one or more local data repositories such as shown in FIG. 2. In addition, a local content source may represent logical subsets of local data repositories such as shown in FIG. 3. For instance, local content sources may be represented by individual databases (e.g. an email archive) and individual folders each maintaining, for instance, music, video or text files.

A client device 106 is a network-enabled electronic device that is under control of a user and is capable of requesting and receiving resources over the network 102. Example client devices 106 include, without limitation, personal computers, mobile communication devices (e.g., smartphones, tablets) and other devices that can send and receive data over the network 102. A client device 106 typically includes a user application, e.g., a web browser, to facilitate the sending and receiving of data over the network 102.

To facilitate searching of resources 105, 107, 113 and 116 the search system 110 identifies the resources by crawling and indexing the resources provided by data repositories 104, 108, 114 and 115. Data about the resources can be indexed based on the resource to which the data corresponds. The indexed and, optionally, cached copies of the resources are stored in search index 112.

In operation, the client devices 106 submit search queries 109 to the search system 110. For instance, any particular search query 109 can include one or more terms consisting of words, numbers or other characters. In response to receipt of the search query 109, the search system 110 accesses (e.g., using a search engine) the search index 112 to identify resources that are relevant to the search query 109. The search system 110 identifies the resources, generates search results 111 that identify the resources 105, and returns the search results 111 to the client devices 106. The resources included in the search results 111 are generally those that have been identified as having at least a threshold relevance score for the search query. A search result 111 is data generated by the search system 110 that identifies a resource that is responsive to a particular search query, and includes a link to the resource. An example search result 111 can include a Web page title, a snippet of text or a portion of an image extracted from the Web page, and the URL of the Web page.

For a search of textual content, the search results are typically ranked based on relevance scores of the resources identified by the search results 111. The relevance scores can be computed, for example, based on information retrieval ("IR") scores, and optionally a quality score of each resource relative to other resources. In some implementations, the IR scores are computed from dot products of feature vectors corresponding to a search query 109 and a resource. Quality scores can be computed, for example, based on visual characteristics of the page, such as page layout, font sizes, and a quantity of images presented on the page. The quality scores can also be computed based on user feedback regarding page quality and/or a determination of whether the page includes, or links to a page that includes, malware (e.g., computer viruses).

The client devices 106 receive the search results 111, e.g., in the form of one or more search result pages 126, and render the search results 111 for presentation to users. Conventionally, the search results 111 are generally ordered on the pages 126 according to these relevance scores and provided to the client device 106 for presentation according to the order.

The manner in which search results are presented to the user in accordance with the techniques described herein will be discussed below.

In one implementation, the search results are clustered into groups based on the content source from which they were obtained. For example, if a user should search for the term "cats," results may be obtained from the user's local client device, the user's online assets and the remainder of the web. The user's local client device, the user's online assets and the remainder of the web may each be treated as a separate content source. Accordingly, the search results are clustered into three groups each corresponding to one of the three different content sources from which they were obtained.

The different content sources may be ranked in accordance to their size (i.e., the number of different resources they contain). In particular, content sources that contain fewer resources may be ranked more highly than content sources that contain more resources. Once the search results have been clustered into groups by content source and ranked, they may be presented to the user in ranked order, with those search results belonging to more highly ranked content sources being presented before those search results belonging to lower ranked content sources. In this way search results obtained from smaller content sources are presented before (i.e., higher or more prominently on the search results page such as search results page 126 shown in FIG. 1) search results obtained from larger content sources. For instance, in FIG. 1 search results 111a are presented before search results 111b, which in turn are presented before search results 111c.

For example, in the case of the aforementioned query using the search term "cats," the search results will be clustered into one of the three groups of content sources— the user's local client device, the user's online assets and the remainder of the web. In this example the user's local client device is deemed to be the smallest content source, the user's online assets are deemed to be a larger content source and the remainder of the web is deemed to be the largest content source. Accordingly, the search results obtained from the user's local client device will be presented first, the search results obtained from the user's online assets will be presented second, and the search results obtained from the remainder of the web will be presented last.

Figure 4:
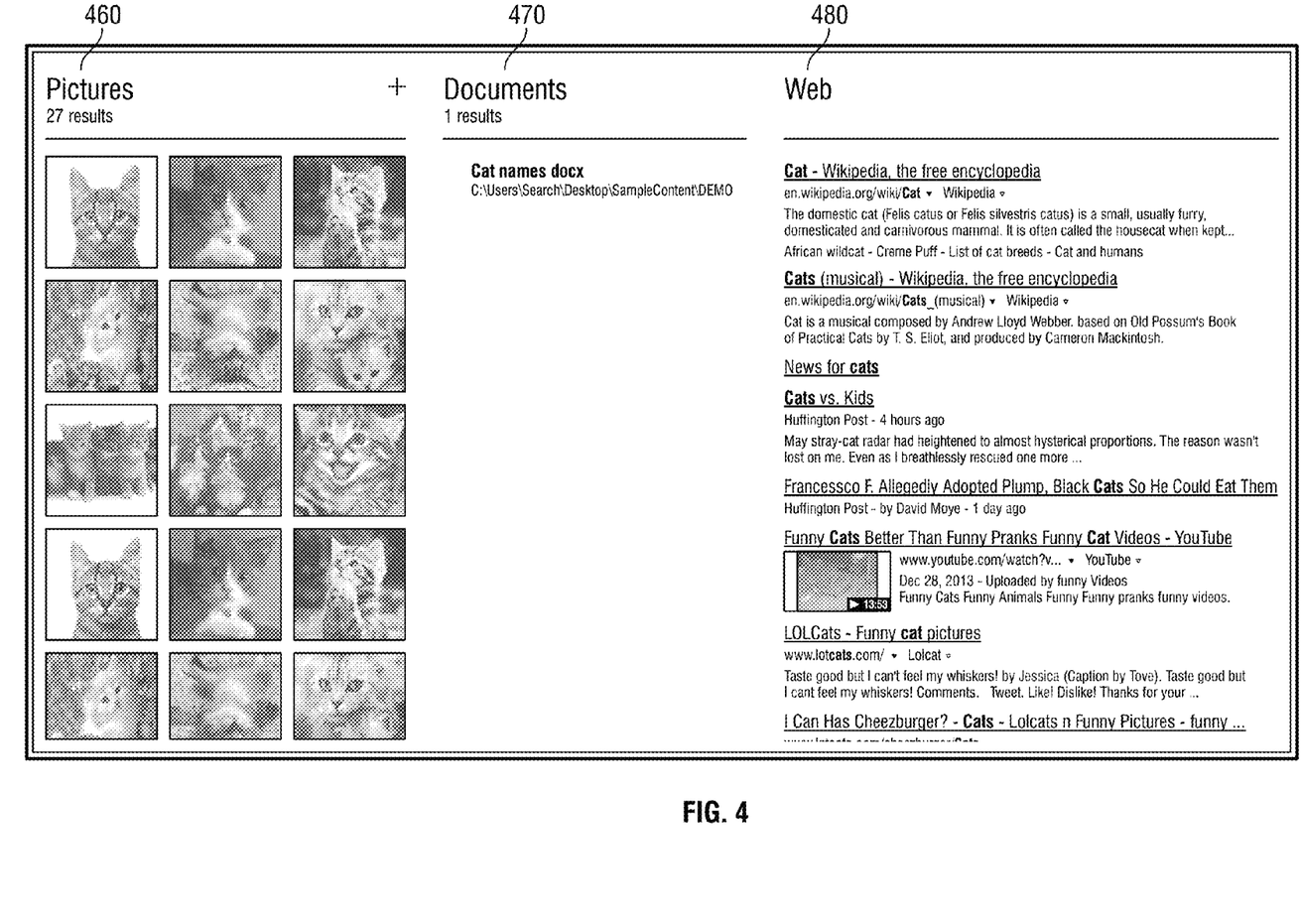
FIG. 4 depicts an example search results web page using the search term "cats."

FIG. 4 depicts an example search results web page using the search term "cats." As shown, in this example the different groups of search results are presented from left to right. The first grouping 460 of search results is image results from the user's local client device, the next grouping 470 of search results is documents from the user's local client device, and the third and final grouping 480 of search results is from the entire web.

The specification of the various content sources into which the search results will be grouped may be performed before, during or after the search results are obtained. Likewise, the ranking of the content sources by size may also be performed before, during or after the search results are obtained. Both the specification of the content sources and their ranking may be performed by the search system and/or the user. In some cases a default set of content sources may be used (e.g., a local content source, a cloud storage service, the rest of the web).

Once the different content sources have been identified, they may be ranked in size in a variety of different ways. For example, indexes of content sources that are built for various purposes may be examined. For instance, client devices often employ local search engines that index their local content sources so that the user can search for documents, photographs, musical selections and the like. These indexes may be used to estimate the number of different resources maintained by the content sources. In other cases the relative size of the content sources may be estimated by the users themselves. If the identification and ranking of the content sources is performed by the user, a user interface operable with the user's web browser may be provided, possibly as a plug-in.

Figure 5:
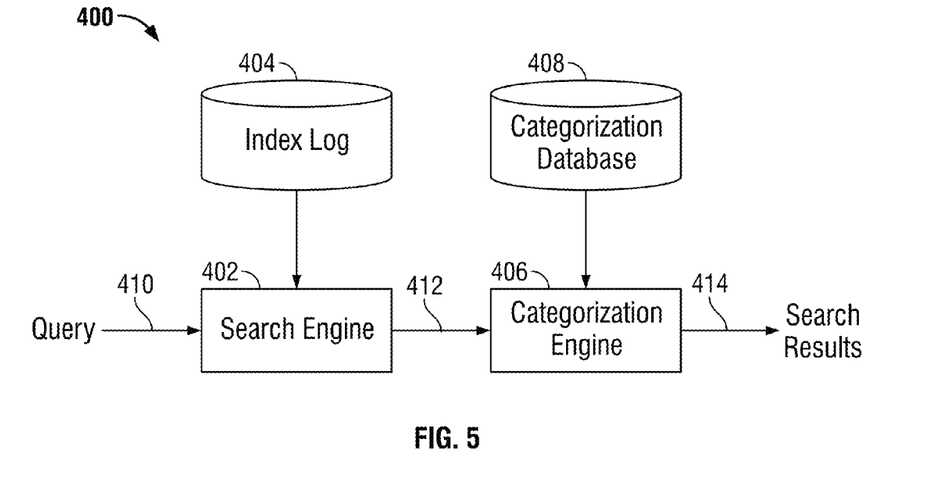
FIG. 5 shows one example of the search system in FIG. 1 which may be used to implement the ranking features discussed above.

FIG. 5 shows one example of the search system 410 in FIG. 1 which may be used to implement the ranking features discussed above. The system 400 includes a search engine 402, an index log 404, a content source categorization engine 406, and a content source categorization database 408. The search engine 402 and the categorization engine 406 can each be provided as one or more computer programs that are executed using one or more computing devices (e.g., servers). The index log 404 and the categorization database 408 can be provided as one or more computer-readable storage media.

The search engine 402 receives a search query 410 (e.g., search query 220). In response to receiving the search query 410, the search engine 402 processes the search query 410 through one or more indices of the index log 404 to identify one or more search results. The search results can be provided in a search results list 412. The index log 404 includes indexed information about resources available over a network (e.g., web pages available on the Internet). In some examples, the index log 404 includes an index of webpages whose content has been analyzed and indexed in view of various criteria (e.g., words extracted from titles, headings, or meta tags).

The categorization engine 406 receives the search results list 412 from the search engine 402 and compares the number of search results in the search results list 412 to a threshold. When the number of search results in the search result list 412 is above the threshold, the categorization engine 406 organizes the search results provided in the search result list 412 into one or more groups based on the content sources from which they were obtained. In some examples, the categorization engine 406 organizes the search results of the search result list 412 in view of previously analyzed content sources, which have been grouped and ranked by size. Data concerning these content sources may be obtained from content source categorization database 408. The manner in which the content sources and their respective sizes are determined has been discussed above. In some implementations, the categorization engine 406 may further rank the search results within each group based on other factors. For example, within each group the search results may be ranked in accordance with conventional measures of relevance.

The categorization engine 406 applies the content source rankings to the search results list 412 to provide a ranked search results list 414 (e.g., ranked search results list 224). When the number of search results of the search result list 412 is less than the threshold, the categorization engine 406 does not organize the search results provided in the search result list 412 into categories and simply provides (i.e., passes along) the search results list 412.

Figure 6:
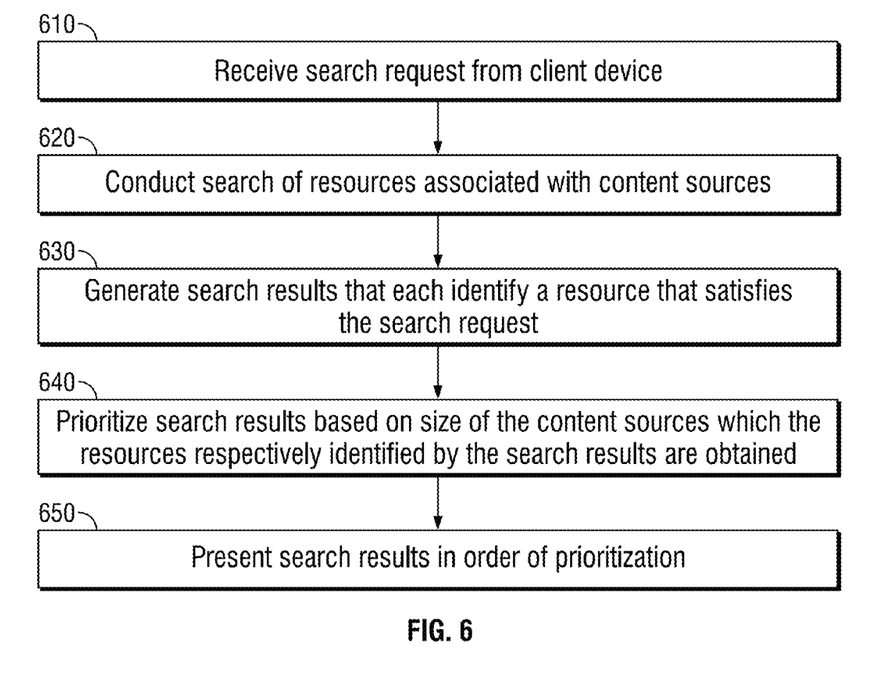
FIG. 6 is a flowchart showing one example of a method for presenting search results to a user of a client device.

FIG. 6 is a flowchart showing one example of a method for presenting search results to a user of a client device. The method begins at block 610 when a search request is received from a client device. In response, a search of resources associated with a plurality of content sources is conducted at block 620. Each of the content sources corresponds to one or more data repositories or a portion of a data repository that store the resources. At least one of the data repositories is an online data repository accessible to the client device over a network. Next, at block 630, a plurality of search results are generated. Each search result identifies a resource that satisfies the search request. The search results are prioritized at block 640 based on a size of the content sources from which the resources respectively identified by the search results are obtained. The size of each content source reflects a total number of resources available therefrom. The search results are presented to the user in order of prioritization at block 650.

Figure 7:
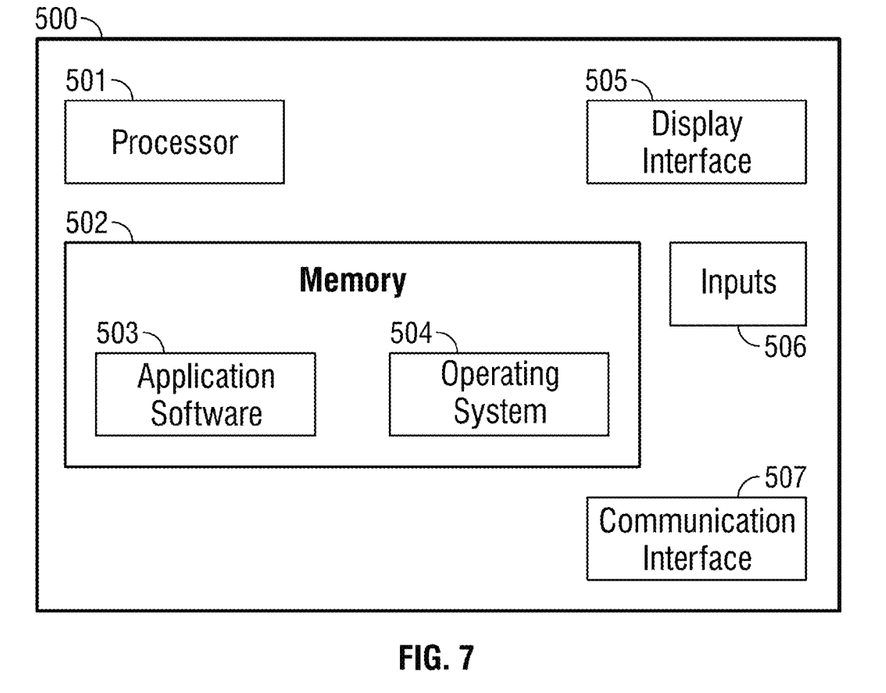
FIG. 7 illustrates various components of an illustrative computing-based device.

FIG. 7 illustrates various components of an illustrative computing-based device 500 which may be implemented as any form of a computing and/or electronic device, and in which embodiments of a search system may be implemented.

The computing-based device 500 comprises one or more inputs 506 which are of any suitable type for receiving media content, Internet Protocol (IP) input, activity tags, activity state information, resources or other input. The device also comprises communication interface 507 to enable the device to communicate with one or more other entity using any suitable communications medium.

Computing-based device 500 also comprises one or more processors 501 which may be microprocessors, controllers or any other suitable type of processors for processing computing executable instructions to control the operation of the device in order to provide a search augmentation system. Platform software comprising an operating system 504 or any other suitable platform software may be provided at the computing-based device to enable application software 503 to be executed on the device.

The computer executable instructions may be provided using any computer-readable media, such as memory 502. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 505 is provided to control a display device to be used in conjunction with the computing device. The display system may provide a graphical user interface, or other user interface of any suitable type.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes, but is not limited to, portable or fixed storage devices, optical storage devices, wireless channels, a SIM card, other smart cards, and various other mediums capable of storing, containing, or carrying instructions or data. However, computer readable storage media do not include transitory forms of storage such as propagating signals, for example.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

The invention claimed is:

1. A method of presenting search results to a user, comprising:
   receiving a search request from a client device, the search request identifying a plurality of content sources to be searched, wherein a default set of content sources includes a local client source, a cloud storage service and the web;
   conducting a search of resources associated with the plurality of content sources, each of the content sources corresponding to one or more data repositories or a portion of a data repository that store the resources;
   generating a plurality of search results that each identify a resource that satisfies the search request;
   prioritizing the search results based on a size of the content sources from which the resources respectively identified by the search results are obtained, the size of each content source reflecting a total number of resources available therefrom,
   wherein search results from a first content source with a first number of resources are prioritized over a second content source having a second number of resources when the first content source has less resources available than the second content source,
   wherein for the default set of content sources, search results obtained from the local client source are prioritized first, search results from the cloud storage service are prioritized second and search results from the web are prioritized third, and
   wherein search results within each content source are further prioritized based upon predetermined measures of relevance; and
   presenting the search results in order of prioritization.

2. The method of claim 1, wherein at least one of the content sources includes a plurality of data repositories associated with a single web address.

3. The method of claim 1, wherein at least one of the content sources is associated with a single web address.

4. The method of claim 1, wherein at least one of the content sources is associated with a single domain name.

5. The method of claim 1, wherein at least one of the content sources is associated with a single enterprise.

6. The method of claim 1, wherein at least one of the content sources is a logical content source associated with a plurality of servers or other physical devices.

7. The method of claim 1, wherein at least one of the content sources is locally accessible to the client device.

8. The method of claim 7, wherein another of the content sources represents all on-line content sources associated with the Internet.

9. The method of claim 1, wherein the plurality of content sources from which the resources are searched are user-defined.

10. One or more computer-readable storage media containing instructions which, when executed by one or more processors perform a method comprising:
    receiving search results in response to a search request identifying a plurality of content sources to be searched, the search results each identifying a resource that satisfies the search request, the resources being associated with the plurality of content sources, each of the content sources corresponding to one or more data repositories or a portion of a data repository that store the resources, wherein a default set of content sources includes a local client source, a cloud storage service and the web;
    prioritizing the search results based on a size of the content sources from which the resources respectively identified by the search results are obtained, the size of each content source reflecting a total number of resources available therefrom;
    wherein for the default set of content sources, search results obtained from the local client source are prioritized first, search results from the cloud storage service are prioritized second and search results from the web are prioritized third, and
    wherein search results within each content source are further prioritized based upon predetermined measures of relevance; and
    presenting the search results in order of prioritization.

11. The one or more computer-readable storage media of claim 10, wherein at least one of the content sources includes a plurality of data repositories associated with a single web address.

12. The one or more computer-readable storage media of claim 10, wherein at least one of the content sources is associated with a single web address.

13. The one or more computer-readable storage media of claim 10, wherein at least one of the content sources is associated with a single domain name.

14. The one or more computer-readable storage media of claim 10, wherein at least one of the content sources is associated with a single enterprise.

15. The one or more computer-readable storage media of claim 10, wherein at least one of the content sources is a logical content source associated with a plurality of servers or other physical devices.

16. The one or more computer-readable storage media of claim 10, wherein at least one of the content sources is locally accessible to the client device.

17. The one or more computer-readable storage media of claim 16, wherein another of the content sources represents all on-line content sources associated with the Internet.

18. The one or more computer-readable storage media of claim 10, wherein the plurality of content sources from which the resources are searched are user-defined.

* * * * *